Dec. 22, 1970 J. M. LOMMEL 3,549,428

MAGNETIC THIN FILMS AND METHOD OF MAKING

Filed Feb. 26, 1968

Inventor:
James M. Lommel,
by Jane M. Binkowski
His Attorney.

United States Patent Office 3,549,428

Patented Dec. 22, 1970

3,549,428

MAGNETIC THIN FILMS AND METHOD OF MAKING

James M. Lommel, Schenectady, N.Y., assignor to General Electric Company, a corporation of New York Filed Feb. 26, 1968, Ser. No. 708,123
Int. Cl. C21d *1/04;* H01f *10/02*
U.S. Cl. 148—31.55 10 Claims

ABSTRACT OF THE DISCLOSURE

A magnetic member is prepared by a process which maintains a low anisotropy dispersion and increases the coercive force in copper diffused iron-nickel alloy magnetic thin films. An iron-nickel alloy film is deposited on a substrate under such deposition conditions and with sufficient nickel content to exhibit a negative magnetostriction. A film of copper is deposited on the alloy film. The film carrying substrate is annealed to diffuse the copper into the alloy film until it has a substantially zero magnetostriction. The magnitude of the negative magnetostriction is controlled so that the film is brought to zero magnetostriction by the desired anneal and diffusion of copper.

Iron-nickel alloys containing 35 to 85% nickel are known as permalloys. Films deposited from these alloys have useful magnetic properties which depend largely on their specific composition. Generally, a permalloy film containing less than 82% nickel has a positive magnetostriction whereas a permalloy film containing more than 82% nickel has a negative magnetostriction. Magnetostriction is measured herein by the quantity $\Delta H_k/H_{ko}$ per unit strain where $\Delta H_k$ is the change in anisotropy field $H_k$ produced by a uniaxial tensile strain along the easy axis, and $H_{ko}$ is the value of the anisotropy field at zero applied strain. A permalloy film comprised of 82% nickel–18% iron has a magnetostriction close to zero, a low anisotropy dispersion $\alpha_{90}$, a low anisotropy field $H_k$, and a low coercive force $H_c$. For certain applications such as high-speed computers, it is desirable to have a high coercive force and a low anisotropy dispersion.

The coercive force of nickel-iron permalloy films can be increased by diffusing copper into the film under suitable time and temperature treatments. Unfortunately, the anisotropy dispersion also increases.

In accordance with the present invention, a magnetic member is prepared by a process which maintains a low anisotropy dispersion while the coercive force is increased by the diffusion of copper in iron-nickel alloy thin films.

The present invention, together with further objects and advantages thereof, will be better understood from the following description taken in connection with the accompanying drawings and its scope will be pointed out in the appended claims.

In the drawings:

FIG. 2 shows the magnetic properties obtained by annealing a copper coated nickel-iron alloy film.

FIG. 3 shows the magnetic properties obtained by annealing a nickel-iron alloy film of the same composition and by the same method in FIG. 2 but without the copper coating.

Figure 1:
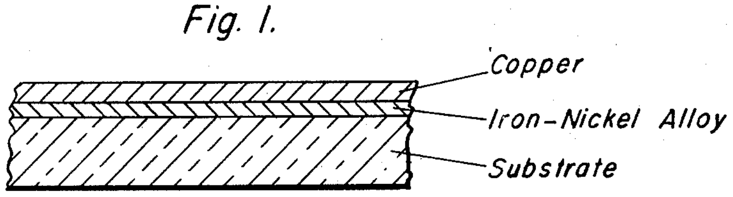
FIG. 1 is a cross-sectional of a magnetic member produced according to this invention.
Figure 2:
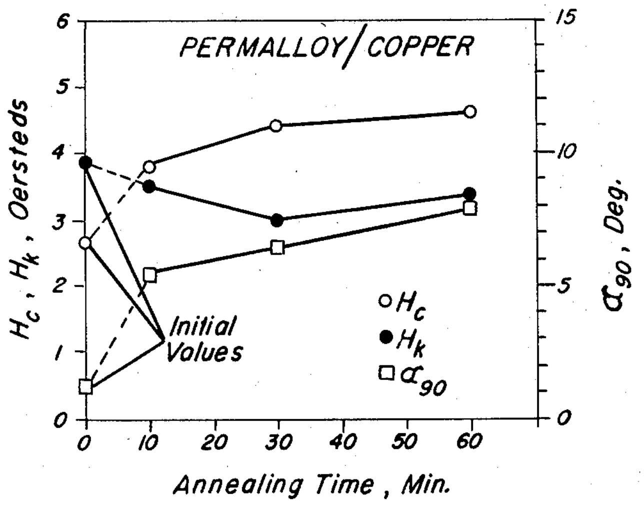
FIGS. 2 and 3 illustrate magnetic properties of nickel-iron alloy films obtainable in the past.
Figure 3:
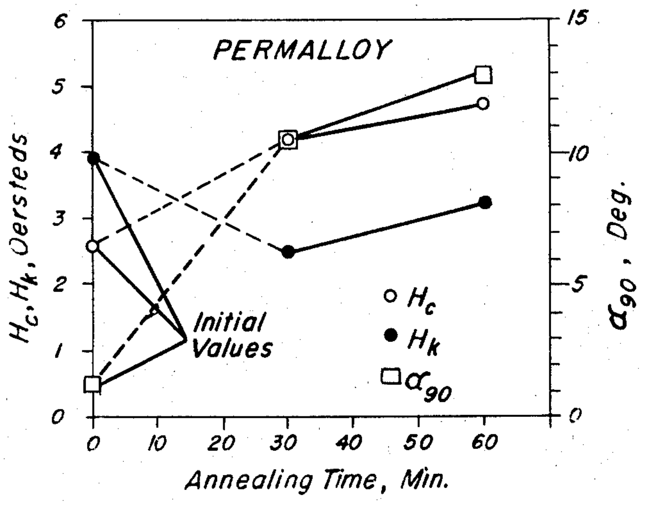

Specifically, FIG. 2 illustrates the magnetic properties of a nickel-iron alloy film coated with copper which resulted from a one hour anneal in hot silicone oil maintained at 340° C. with a magnetic field applied along the film easy axis. An 82.1% nickel–17.9% iron melt was used to deposit an 800 angstrom thick film at 20 angstroms per second in a vacuum wherein the substrate holder was maintained at 300° C. The copper was deposited at a rate of 4.7 angstroms per second to a thickness of 400 angstroms with the substrate holder maintained at 97° C. FIG. 2 shows that the anneal increases the coercive force $H_c$ so that the film becomes inverted, i.e. $H_c/H_k>1$, and the anisotropy dispersion $\alpha_{90}$ also increases from a typical value for the as-deposited copper coated alloy film of 1° to a value of 8° for the copper diffused film. FIG. 3 illustrates the magnetic properties of an alloy film of the same melt composition as FIG. 2 but without the copper coating. The alloy film of FIG. 3 was prepared in the same manner as the film in FIG. 2 except that it was deposited at 17 angstroms per second to a thickness of 790 angstroms. It was annealed in the same manner as FIG. 2. FIG. 3 shows that the anneal increases the coercive force $H_c$ so that the film becomes inverted but with a much higher value for the anisotropy dispersion, i.e. 13°.

The anisotropy dispersion $\alpha_{90}$ is a measure of the distribution of local easy axes of the anisotropy of the iron-nickel alloy films.

While the copper diffused permalloy films have the desired property for several memory applications of being inverted, the anisotropy dispersion $\alpha_{90}$ of 8° is still too high for a number of applications. There is a need for inverted films with very low anisotropy dispersion in high density magnetic film memories.

The present invention provides a process for maintaining a low anisotropy dispersion while increasing the coercive force in copper diffused iron-nickel alloy magnetic thin films.

In carrying out the instant process, a nickel-iron alloy film having a negative magnetostriction is formed on a substrate in a conventional manner with deposition rate and composition controlled to produce a film having a negative magnetostriction.

The substrate must be inert at the temperatures of the depositions and anneal. It must also have at least one smooth surface for deposition of the film. The size or shape of the substrate is not critical. Typical substrates are glass, polished metal and plastic.

Generally, the nickel-iron alloy melt used to deposit a film having a negative magnetostriction contains nickel in an amount in excess of 82% and may range from about 82.1 to 90% nickel. Usually, melts containing more than 90% nickel will deposit films having a magnetostriction so highly negative that it is difficult to raise them to substantially zero magnetostriction by the process of this invention. Films with the most desirable properties are obtained with alloy melts containing 82.1 to 85% nickel. Melt compositions are given because they are more readily and precisely determined by conventional methods than film compositions. Film compositions are most readily measured by the magnetostriction of the film. A nickel-iron alloy melt containing less than 82% nickel may be used if the deposition rate is controlled so that the film contains sufficient nickel so that it has a negative magnetostriction.

It is assumed that the deposition of the alloy film is carried out in a conventional manner so that the composition of the film is substantially the same as the composition of the alloy melt. Characteristically there is a small difference in the nickel content of the alloy film as compared to the melt, usually about 2 to 3%. This difference is largely a function of the rate of deposition, presumably because the fractionation between vapor and melt is a function of melt temperature and the melt temperature determines the deposition rate for a fixed geometry.

The iron-nickel alloy and copper films are deposited by any conventional method. For example, the films may be vacuum deposited from an electron heated source or a resistance heated source.

The thickness of the nickel-iron alloy film depends on the particular properties desired. The alloy film may range from a film-forming thickness, i.e. about 100 angstroms, to about 2000 angstroms. For most applications, films ranging from about 300 to 1000 angstroms are satisfactory.

The deposited copper film may range from a film-forming thickness i.e. about 100 angstroms, to a thickness of several microns. Its specific thickness depends on the particular annealing process used for diffusing the copper into the alloy film to get substantially zero magnetostriction.

The present process can also be carried out by depositing the copper film on the substrate and then depositing the nickel-iron alloy film on the copper film.

In some cases it is desirable to have a nickel-iron alloy film having regions of low coercive force surrounded by regions of high coercive force. For such applications, the copper is deposited in the desired pattern prior to diffusion anneal.

The substrate temperature for depositing the iron-nickel alloy film may range from about 200° C. to 400° C. A substrate temperature of about 300° C. is satisfactory.

The copper film can be deposited at a substrate temperature ranging from about room temperature to 350° C. Temperatures higher than 350° C. can cause excessive grain growth and problems of non-uniformity. A substrate temperature of about 300° C. is satisfactory.

To reduce dispersion, the deposition of the nickel-iron alloy film must be carried out with a magnetic field applied parallel to the desired easy axis direction. The magnetic field must be made large enough to saturate the film to magnetize it uniformly and substantially align the anisotropy. In the instant process, a magnetic field of about 45–50 oersteds is satisfactory. Amounts greater than 50 oersteds show little additional significant effect.

Since copper is a non-magnetic material, it can be deposited in the presence or absence of a magnetic field. However, if the copper is deposited on the alloy film at a substrate temperature above room temperature, the magnetic field should be left on to maintain the low anisotropy of the alloy film.

When deposition of the films is complete, the coated substrate should be cooled to room temperature under conditions which prevent significant oxidation of the alloy film and which maintain its low anisotropy. This can be done by allowing the coated substrate to cool to room temperature within the deposition chamber in the same vaccum and magnetic field used in depositing the film.

The diffusion of copper into the nickel-iron alloy film is carried out in the presence of a magnetic field aligned parallel to the easy axis. Again the magnetic field should be of a magnitude which saturates the film. A magnetic field of about 45–50 oersteds is usually sufficient. A stronger magnetic field may be used, but generally has little additional effect.

The copper diffusion is carried out at an annealing temperature of about 290° C.–355° C. Temperatures lower than 290° C. diffuse the copper at a rate too slow for practical application and temperatures higher than 355° C. cause high rates of reaction which are difficult to control precisely.

In the instant process, the annealing should be carried out under conditions which prevent oxidation of the alloy film. Annealing in an inert liquid medium such as silicone oil or in a vacuum is suitable.

The specific annealing process must diffuse copper into the nickel-iron alloy film in an amount sufficient to bring the alloy film to substantially zero magnetostriction. This is determinable empirically. For example, if a thick film of copper is deposited, an annealing time and temperature is selected which will diffuse copper into the alloy film in an amount sufficient to produce substantially zero magnetostriction. This can be devised by plotting magnetostriction against annealing time for a particular temperature. On the other hand, the thickness of the copper film may be controlled so that with a specific film thickness at a fixed annealing temperature and time substantially zero magnetostriction is obtained. This can be devised by plotting magnetostriction against copper film thickness for a specific temperature and period of time.

The invention is further illustrated by the following examples. In the examples, as well as FIGS. 2 and 3, the anisotropy dispersion, $\alpha_{90}$, was measured with an 800 Hz. hysteresis loop tracer. In this test the drive field is initially aligned parallel to the hard axis of the anisotropic film and the component of magnetization perpendicular to the drive field is displayed versus the drive field on the loop tracer. The film is aligned with the drive field along the hard axis so that there is no net magnetization signal sensed by the pickup coils. The film is then rotated in the loop tracer until the net magnetization at the instantaneous zero value of the drive field reaches 90% of its saturation value. The angle through which the film was rotated is the value of the angular dispersion, $\alpha_{90}$.

$H_c$ was measured from the hysteresis loop display when the drive field was applied parallel to the easy axis.

$H_k$ was measured from the slope of the hard axis hysteresis loop using the I.E.E.E. standard technique.

EXAMPLE 1

In this example films were deposited by electron beam evaporation using conventional equipment. A Bell-jar vacuum system with a 4 inch oil diffusion pump was used.

A glass substrate 1⅛ inch by 1½ inch and 0.005 inch thick was mounted in a substrate holder in contact with a copper block heat source within the deposition chamber.

An 83.1% nickel–16.9% iron alloy ingot was mounted within the deposition chamber as well as a copper ingot. The ingots were positioned ten inches from the substrate. A 2 kw. gun was used to furnish electrons.

The deposition chamber was maintained at a pressure of less than $10^{-5}$ torr throughout the process.

The substrate holder was heated in the vacuum to a temperature of 300° C. A magnetic field of 45 oersteds was then applied parallel to the desired easy axis and deposition was begun. The substrate holder temperature was maintained at a temperature of 300° C. during deposition of the alloy.

The alloy ingot was raised to a temperature sufficiently high above the melting point to achieve a deposition rate of 18 angstroms per second on the substrate. The deposition was carried out for ¾ minute, and the final alloy film was 800 angstroms thick.

The substrate holder was maintained at 300° C. for the copper deposition.

The copper ingot was then raised to a temperature sufficiently high above its melting point during the same pump-down to achieve a deposition rate of 5 angstroms per second on the deposited alloy film. This deposition was carried out for 1.5 minutes. The final thickness of the copper film was 425 angstroms.

The coated substrate was allowed to cool to room temperature in the vacuum and in the presence of the same magnetic field.

The cooled substrate was removed from the deposition chamber, and the magnetic properties of the alloy film were determined. It had a coercive force $H_c$ of 3.1 oersteds, an anisotropy field of 3.6 oersteds, an anisotropy dispersion $\alpha_{90}$ of 1 degree, and a negative magnetostriction coefficient of −2000.

The coated substrate was immersed in a beaker of hot silicone oil (SF 81–50) preheated to 333° C. with a field of 75 oersteds applied parallel to the easy axis of the film. The silicone oil was maintained at a temperature of 333° C. throughout the annealing. At the end of 15 minutes the coated substrate was removed from the oil and allowed to cool in air to room temperature in the presence of the aligning magnetic field.

The alloy film had a coercive force of 3.6 oersteds, an anisotropy field of 3.3 oersteds, a magnetostriction coefficient of −50 and an anisotropy dispersion $\alpha_{90}$ of 1.7°.

As a result of this annealing procedure, the coercive force was raised 0.5 oersted and the anisotropy field was reduced 0.3 oersted to produce an inverted film, i.e., $H_c/H_k>1$. At the same time, the anisotropy dispersion was maintained at a low level.

This example illustrates the present invention. The magnetostriction coefficient of −50 is considered herein as equivalent to a magnetostriction coefficient of substantially zero due to experimental error.

EXAMPLE 2

In this example, an alloy film was formed which exhibited a positive magnetostriction coefficient initially.

The films were prepared in the same manner as disclosed for Example 1 except that an 82.2% nickel–17.8% iron alloy was used to deposit an 800 angstrom thick film at the rate of 13 angstroms per second and copper was deposited at a rate of 4.5 angstroms per second to form a film 390 angstroms thick.

The alloy film had a coercive force $H_c$ of 3.2 oersteds, an anisotropy field $H_k$ of 3.95 oersteds, a magnetostriction of +380 and an anisotropy dispersion $\alpha_{90}$ of 0.8°.

The coated substrate was annealed in the same manner as Example 1 except that the annealing tempertaure was 335° C. and the annealing time was 20 minutes.

After annealing, the alloy film had a coercive force $H_c$ of 4.2 oersteds, an anisotropy field $H_k$ of 3.4 oersteds, a magnetostriction coefficient of +1600 and an anisotropy dispersion $\alpha_{90}$ of 4.77°.

This example does not embody the invention and although the result here was an inverted film, the increase in the magnetostriction coefficient was accompanied by a very significant and undesirable increase in the anisotropy dispersion.

What I claim as new and desire to secure by Letters Patent of the United States is:

1. A method of preparing a magnetic member which comprises depositing in a magnetic field a nickel-iron alloy containing about 82.1 to 90 percent nickel on a substrate having a temperature ranging from about 200° to 400° C. to form a film having a negative magnetostriction, said magnetic field being applied parallel to the easy axis direction to substantially align the anisotropy, depositing copper onto the alloy film at a substrate temperature ranging from about room temperature to 350° C., and annealing the film carrying substrate in a magnetic field at an annealing temperature of about 290° C. to 355° C. until copper has diffused into the alloy film in an amount sufficient to impart to the alloy film substantially zero magnetostriction, said magnetic field being applied parallel to the easy axis and having a magnitude which saturates the film.

2. A method according to claim 1 wherein said nickel-iron alloy contains about 82.1 to 90 percent nickel.

3. A method according to claim 1 wherein said alloy film ranges in thickness up to about 2000 angstroms.

4. A method according to claim 1 wherein said copper is deposited on substantially the entire area of a surface of the alloy film.

5. A method according to claim 1 wherein said copper is deposited in a pattern on a surface of the alloy film.

6. A method according to claim 1 wherein said annealing is carried out in an inert liquid medium.

7. A magnetic member comprised of a substrate carrying a copper diffused nickel-iron alloy film, said copper having been diffused into said nickel-iron alloy film in an amount sufficient to have imparted to the alloy a substantially zero magnetostriction.

8. A magnetic member according to claim 7 wherein the nickel-iron alloy film ranges in thickness up to about 2000 angstroms.

9. A magnetic member according to claim 7 wherein the copper covers substantially the entire area of a surface of the alloy film.

10. A magnetic member according to claim 7 wherein the copper is in the form of a pattern.

References Cited

UNITED STATES PATENTS

| | | | |
|---|---|---|---|
| 3,133,874 | 5/1964 | Morris | 204—192X |
| 3,370,929 | 2/1968 | Mathias | 29—199X |
| 3,375,091 | 3/1968 | Feldtkeller | 29—196.3X |
| 3,383,761 | 5/1968 | Hayasaka et al. | 29—199X |
| 3,433,721 | 3/1969 | Wolf | 29—199X |
| 3,472,708 | 10/1969 | Schindler et al. | 148—108 |

FOREIGN PATENTS

| | | | |
|---|---|---|---|
| 1,219,694 | 6/1966 | Germany | 75—170 |

OTHER REFERENCES

IBM Technical Disclosure Bulletin, Magnetic Thin-Film Alloy with Improved Thermal Stability, vol. 8, No. 10, March 1966.

L. DEWAYNE RUTLEDGE, Primary Examiner

G. K. WHITE, Assistant Examiner

U.S. Cl. X.R.

29—196.3, 199; 117—234; 148—108, 121